United States Patent
Levy et al.

(10) Patent No.: US 11,550,715 B2
(45) Date of Patent: Jan. 10, 2023

(54) VIRTUAL SPLITTING OF MEMORIES

(71) Applicant: MELLANOX TECHNOLOGIES TLV LTD., Raanana (IL)

(72) Inventors: Gil Levy, Hod HaSharon (IL); Pedro Reviriego, Madrid (ES); Salvatore Pontarelli, Rome (IT)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 153 days.

(21) Appl. No.: 16/994,600

(22) Filed: Aug. 16, 2020

(65) Prior Publication Data
US 2022/0050774 A1    Feb. 17, 2022

(51) Int. Cl.
*G06F 12/06* (2006.01)
*G06F 21/56* (2013.01)

(52) U.S. Cl.
CPC ............ *G06F 12/06* (2013.01); *G06F 21/566* (2013.01); *G06F 2212/1052* (2013.01); *G06F 2221/034* (2013.01)

(58) Field of Classification Search
CPC ......... G06F 2212/1016; G06F 12/0238; G06F 12/0246; G06F 12/0638; G06F 2009/45583; G06F 21/566; G06F 2212/657; G06F 2221/034; G06F 12/06; G06F 2212/1052
USPC ........................ 711/104, 200, 12.001, 12.058
See application file for complete search history.

(56) References Cited

U.S. PATENT DOCUMENTS

| | | | |
|---|---|---|---|
| 7,895,392 B2 | 2/2011 | Shen et al. | |
| 9,124,539 B2 * | 9/2015 | Pope | H04L 49/30 |
| 10,171,419 B2 | 1/2019 | Kravchik et al. | |
| 10,491,521 B2 | 11/2019 | Levy et al. | |
| 10,515,015 B2 | 12/2019 | Levy et al. | |
| 10,642,733 B1 * | 5/2020 | Hayut | G06F 12/0292 |
| 10,684,960 B2 | 6/2020 | Levy et al. | |
| 2003/0041154 A1 * | 2/2003 | Tran | G06F 21/6218 |
| | | | 709/205 |
| 2003/0050782 A1 * | 3/2003 | Zweig | G06F 40/20 |
| | | | 704/270 |
| 2007/0255770 A1 * | 11/2007 | Murase | G06F 3/0649 |
| 2015/0356026 A1 | 12/2015 | Lee et al. | |

(Continued)

OTHER PUBLICATIONS

Gao et al., "Internet Cache Pollution Attacks and Countermeasures", Proceedings of the 14th IEEE International Conference on Network Protocols, Santa Barbara, USA November, pp. 1-11, 12-15, 2006.

(Continued)

*Primary Examiner* — Yaima Rigol
*Assistant Examiner* — Edward Waddy, Jr.
(74) *Attorney, Agent, or Firm* — Kligler & Associates Patent Attorneys Ltd

(57) ABSTRACT

A system includes a memory, including a plurality of memory locations having different respective addresses, and a processor. The processor is configured to compute one of the addresses from (i) a first sequence of bits derived from a tag of a data item, and (ii) a second sequence of bits representing a class of the data item. The processor is further configured to write the data item to the memory location having the computed address and/or read the data item from the memory location having the computed address. Other embodiments are also described.

28 Claims, 3 Drawing Sheets

(56) References Cited

U.S. PATENT DOCUMENTS

| | | | |
|---|---|---|---|
| 2016/0021018 A1* | 1/2016 | Hui | H04L 47/34 |
| | | | 370/412 |
| 2017/0103210 A1* | 4/2017 | Baji-Gál | G06F 21/52 |
| 2017/0177367 A1* | 6/2017 | DeHon | G06F 21/52 |
| 2018/0121200 A1* | 5/2018 | Chou | G06F 9/3804 |
| 2019/0205244 A1* | 7/2019 | Smith | G06F 3/065 |
| 2020/0201789 A1* | 6/2020 | Durham | H04L 9/0631 |
| 2022/0050904 A1* | 2/2022 | Sullivan | H04L 67/1097 |

OTHER PUBLICATIONS

Yao et al., "Detection and Defense of Cache Pollution Attacks Using Clustering in Named Data Networks", IEEE Transactions on Dependable and Secure Computing, pp. 1-111, Oct. 16, 2018.

Liu et al., "Last level cache side-channel attacks are practical", IEEE Symposium on Security and Privacy, pp. 605-622, year 2015.

Irazoqui et al., "S$A: A shared cache attack that works across cores and defies VM sandboxing—and its application to AES", IEEE Symposium on Security and Privacy, pp. 591-604, year 2015.

Osvik et al., "Cache attacks and countermeasures: The case of AES", Proceedings of The Cryptographers' Track RSA Conference, pp. 1-25, Aug. 14, 2005.

Senecal, "Understanding and preventing attacks at layer 2 of the OSI reference model", 4th Annual Communication Networks and Services Research Conference (CNSR), p. 1, May 24-25, 2006.

\* cited by examiner

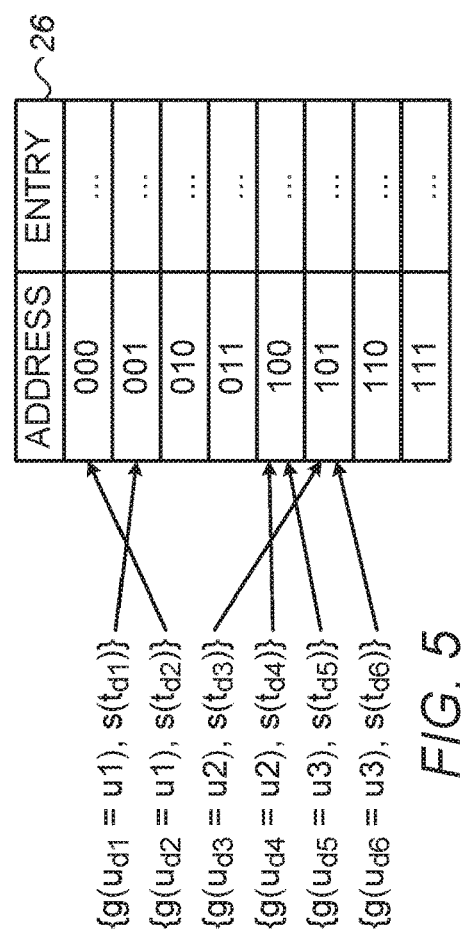
FIG. 5
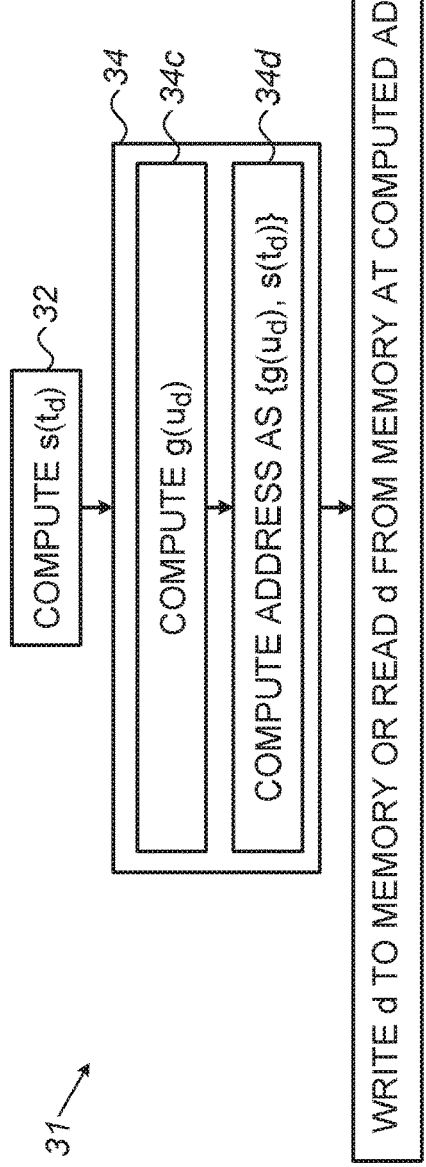
FIG. 4
FIG. 6

VIRTUAL SPLITTING OF MEMORIES

FIELD OF THE INVENTION

The present invention is related to memories in routers, switches, computers, and other devices.

BACKGROUND

Memories used for caching data may be subjected to various forms of attack by malicious parties. In one such form of attack, known as a cache pollution attack, an attacker pollutes the memory with entries that are not used (or are not frequently used) by legitimate users of the memory, thus increasing the number of cache misses experienced by the legitimate users. In another such form of attack, the attacker exploits sharing of the memory between multiple processes to execute a side-channel attack.

US Patent Application Publication 2015/0356026 describes a cache memory including a data array storing a plurality of data elements, a tag array storing a plurality of tags corresponding to the plurality of data elements, and an address decoder which permits dynamic memory-to-cache mapping. The address decoder receives a context identifier and a plurality of index bits of an address passed to the cache memory, and determines whether a matching value in a line number register exists. The line number registers allow for dynamic memory-to-cache mapping, and their contents can be modified as desired. Methods for accessing and replacing data in a cache memory are also provided, wherein a plurality of index bits and a plurality of tag bits at the cache memory are received. The plurality of index bits are processed to determine whether a matching index exists in the cache memory and the plurality of tag bits are processed to determine whether a matching tag exists in the cache memory, and a data line is retrieved from the cache memory if both a matching tag and a matching index exist in the cache memory. A random line in the cache memory can be replaced with a data line from a main memory, or evicted without replacement, based on the combination of index and tag misses, security contexts and protection bits. User-defined and/or vendor-defined replacement procedures can be utilized to replace data lines in the cache memory.

U.S. Pat. No. 7,895,392 describes color-based caching allowing each cache line to be distinguished by a specific color, and enabling the manipulation of cache behavior based upon the colors of the cache lines.

SUMMARY OF THE INVENTION

There is provided, in accordance with some embodiments of the present invention, a system, including a memory, including M memory locations having different respective addresses, and a processor. The processor is configured to compute a first sequence $s(t_d)$ of ceiling($\log_2$ N) bits by applying a function s, which maps to N different values, to a tag $t_d$ of a data item d, N being less than M. The processor is further configured to compute one of the addresses from $s(t_d)$ and a second sequence $u_d$ of one or more bits representing a class of d. The processor is further configured to perform an operation selected from the group of operations consisting of: writing d to the memory location having the computed address, and reading d from the memory location having the computed address.

In some embodiments,
the function s is a first function, and
the processor is configured to compute the address by applying a second function, which maps to any one of the addresses, to a combination of $u_d$ with $s(t_d)$.

In some embodiments, the processor is configured to apply the second function to a concatenation of $u_d$ with $s(t_d)$.

In some embodiments,
the function s is a first function,
B=ceiling($\log_2$ M)–ceiling($\log_2$ N) is at least one, and
the processor is configured to compute the address by:
computing a third sequence $g(u_d)$ of B bits by applying a second function g, which maps to $2^B$ different values, to $u_d$, and
combining $s(t_d)$ with $g(u_d)$.

In some embodiments, the system further includes another memory configured to store an association between multiple classes of data items and respective functions that include the function s, N varying between at least two of the functions,
the processor being further configured to select the function s in response to the function s being associated, in the other memory, with the class of d.

In some embodiments, the processor is further configured to associate with the class of d, in the other memory, another function, which maps to K<N different values, instead of the function s, in response to identifying an attack on the memory.

In some embodiments, d includes one or more packet-processing instructions for packets belonging to any flow of network traffic whose identifier includes a specific value of at least one field, and $u_d$ represents the class of d by virtue of indicating the value.

In some embodiments, the at least one field includes a field selected from the group of fields consisting of: a layer-2 source address, a layer-3 source address, a layer-4 source address, a layer-2 destination address, a layer-3 destination address, and a layer-4 destination address.

In some embodiments, d includes one or more packet-processing instructions for packets received at a specific port, and $u_d$ represents the class of d by virtue of indicating the port.

In some embodiments, $u_d$ represents the class of d by virtue of identifying a process, running on the processor, that performs the operation.

In some embodiments, $u_d$ represents the class of d by virtue of identifying the processor.

In some embodiments, $u_d$ represents the class of d by virtue of indicating a level of privilege required to overwrite d in the memory.

There is further provided, in accordance with some embodiments of the present invention, a method, including, using a processor, computing a first sequence $s(t_d)$ of ceiling ($\log_2$ N) bits by applying a function s, which maps to N different values, to a tag $t_d$ of a data item d, N being less than a number M of memory locations, which have different respective addresses, in a memory. The method further includes computing one of the addresses from $s(t_d)$ and a second sequence $u_d$ of one or more bits representing a class of d. The method further includes performing an operation selected from the group of operations consisting of: writing d to the memory location having the computed address, and reading d from the memory location having the computed address.

There is further provided, in accordance with some embodiments of the present invention, a system including a memory, including a plurality of memory locations having different respective addresses, and a processor. The processor is configured to compute one of the addresses from (i) a first sequence of bits derived from a tag of a data item, and (ii) a second sequence of bits representing a class of the data item. The processor is further configured to write the data item to the memory location having the computed address and/or read the data item from the memory location having the computed address.

In some embodiments, the processor is further configured to compute the first sequence of bits by applying a function, which maps to N different values, to the tag of the data item, N being less than a number of the memory locations.

In some embodiments,
the function is a first function, and
the processor is configured to compute the address by applying a second function, which maps to any one of the addresses, to a combination of the first sequence of bits with the second sequence of bits.

In some embodiments,
the function is a first function, and
the processor is configured to compute the address by:
computing a third sequence of bits by applying a second function to the second sequence of bits, and
combining the first sequence of bits with the third sequence of bits.

The present invention will be more fully understood from the following detailed description of embodiments thereof, taken together with the drawings, in which:

BRIEF DESCRIPTION OF THE DRAWINGS

FIG. 4 is a flow diagram for an example algorithm for writing a data item to, or reading a data item from, a memory, in accordance with some embodiments of the present invention;

FIG. 5 schematically illustrates virtual splitting of a memory, in accordance with some embodiments of the present invention; and FIG. 6 is a schematic illustration of an association of data-item classes with respective functions, in accordance with some embodiments of the present invention.

DETAILED DESCRIPTION OF EMBODIMENTS

Overview

Embodiments of the present invention protect a memory from cache pollution and other forms of attack, by virtually splitting the memory between different classes (or "categories") of data so as to limit the maximum number of locations in the memory that may be occupied, at any time, by any given class. Advantageously, embodiments of the present invention do not necessitate "coloring" the entries in the memory according to class, maintaining a count of the current number of entries per class, or any other significant allocation of resources. Moreover, any suitable classification scheme may be used to classify the data.

For example, in a memory belonging to a networking element, the number of memory locations occupied by data items received from any given source address may be limited, such that a malicious source address cannot pollute the entire memory. As another example, in a memory shared by multiple processes, the number of locations to which each process may write may be limited, such that a single process cannot pollute the entire memory.

More specifically, per the virtual splitting techniques described herein, the memory address assigned to any given data item is a function of both a tag of the data item and the class of the data item. In particular, the tag is hashed to a range of values, and the address is then computed from the resulting hash value, referred to herein as the "tag hash," and another sequence of bits representing the class. To limit the number of memory locations that may be occupied by the class at any given time, the hash function for hashing the tag is selected so as to limit the number of different values attainable by the tag hash.

In some embodiments, the address is computed by concatenating the tag hash with the class-representing sequence of bits, and then hashing the concatenation to the range of addresses in the memory. In other embodiments, the order of the aforementioned concatenating and hashing operations is reversed, in that the address is computed by concatenating the tag hash with a hash of the class-representing bit-sequence.

In some embodiments, different classes are allotted differently-sized portions of the memory. For example, for embodiments in which the memory is shared by multiple processes, a higher-priority process may be allocated a greater portion of the memory than a lower-priority process.

System Description

Figure 1A:
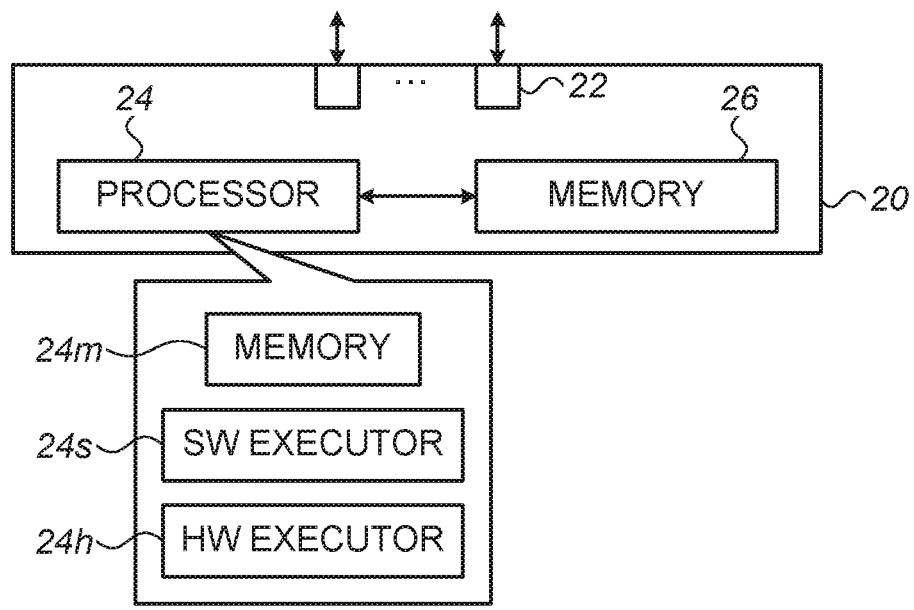
FIG. 1A is a schematic illustration of a networking element, in accordance with some embodiments of the present invention.

Reference is initially made to FIG. 1A, which is a schematic illustration of a networking element 20, in accordance with some embodiments of the present invention. Networking element 20 may comprise, for example, a network interface controller (NIC), a switch, a router, a network processor, or a communication controller.

Networking element 20 comprises one or more communication ports 22 and a processor 24. Processor 24 is configured to receive packets of network traffic via ports 22, and to process each of the packets (e.g., by modifying and/or forwarding each of the packets) in accordance with predefined packet-processing instructions. Communication ports 22 may comprise, for example, an InfiniBand port, an Ethernet port, and/or a loopback port.

Networking element 20 further comprises a memory 26, which is configured to facilitate faster retrieval of data stored therein, relative to a main memory (e.g., a random access memory (RAM)). Hence, to expedite processing the packets, the processor may write data to memory 26, such that the processor may subsequently read the data from the memory without needing to access the main memory of the networking element.

For example, the processor may write the aforementioned packet-processing instructions to the memory. Upon receiving any packet, the processor may look up, in memory 26, the appropriate instructions for the packet, and then process the packet in accordance with the instructions.

Advantageously, as further described below with reference to FIGS. 3 and 5, memory 26 is virtually split between the classes of data items stored in the memory, such that the maximum number of locations in the memory that may be occupied by any given class at any given time is less than the total number of locations in the memory.

In some embodiments, each data item stored in memory 26 includes one or more packet-processing instructions for packets belonging to any flow of network traffic whose identifier (e.g., whose 5-tuple) includes a specific value of at least one field, such as a specific layer-2, layer-3, or layer-4 source address or destination address, and the class of the data item corresponds to the value. Thus, for example, the class of each data item may correspond to a specific source Internet Protocol (IP) address, such that two data items including packet-processing instructions for different respective source IP addresses are deemed to belong to different respective classes.

In other embodiments, each data item includes one or more packet-processing instructions for packets received at a specific port 22, and the class of the data item corresponds to the port. In yet other embodiments, each data item includes one or more packet-processing instructions for a combination of a specific port with a specific value of at least one flow-identifier field, and the class of the data item corresponds to the combination.

In some embodiments, processor 24 comprises both a software (SW) executor 24s, which executes software instructions, and a hardware (HW) executor 24h, which executes hardware instructions. Each of software executor 24s and hardware executor 24h may write to, and read from, memory 26.

Typically, processor 24 comprises another memory 24m, comprising, for example, a RAM and/or control register, which facilitates performing the functionality described herein.

Figure 1B:
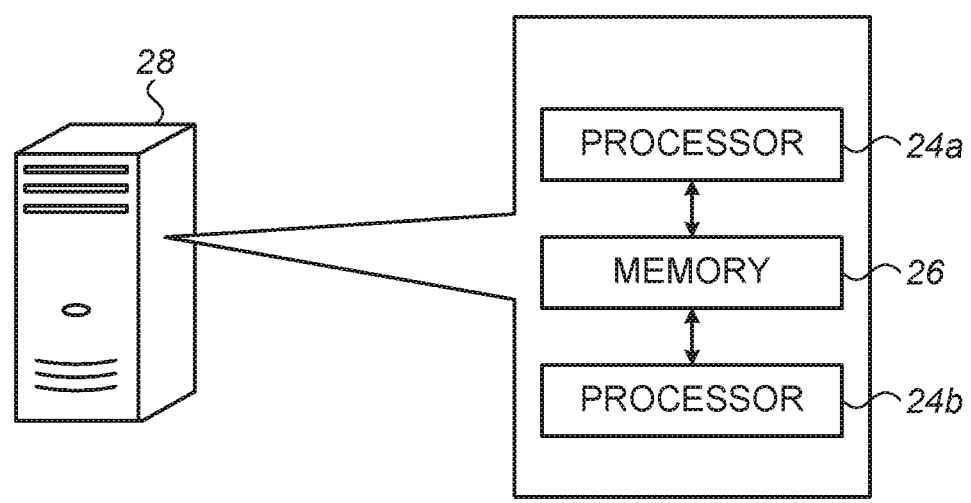
FIG. 1B is a schematic illustration of a computer, in accordance with some embodiments of the present invention.

Reference is now made to FIG. 1B, which is a schematic illustration of a computer 28, in accordance with some embodiments of the present invention. Computer 28 may comprise, for example, a personal computer or a cloud server.

Computer 28 comprises multiple processors, such as a first processor 24a and a second processor 24b, each of which may comprise any of the components described above for processor 24 (FIG. 1A). Computer 28 further comprises memory 26, which is shared between the processors.

As in the case of FIG. 1A, memory 26 is virtually split between classes of data items. The class of each data item may correspond to whichever processor writes the data item to the memory, such that the maximum number of locations in the memory that each processor may use is less than the total number of locations in the memory. Alternatively or additionally, memory 26 may be shared between multiple cores of a single processor and/or between multiple processes running on a single processor, and the class of each data item may correspond to whichever core and/or process writes the data item to the memory.

Notwithstanding the specific embodiments shown in FIGS. 1A-B, it is noted that the virtual-splitting techniques described herein may be implemented in any suitable system comprising one or more processors and memory 26.

In general, each of the processors described herein may be embodied as a single processor, or as a cooperatively networked or clustered set of processors. The functionality of any one of the processors described herein may be implemented solely in hardware, e.g., using one or more fixed-function or general-purpose integrated circuits, Application-Specific Integrated Circuits (ASICs), and/or Field-Programmable Gate Arrays (FPGAs). Alternatively, this functionality may be implemented at least partly in software.

For example, any one of the processors described herein may be embodied as a programmed processor comprising, for example, a central processing unit (CPU) and/or a Graphics Processing Unit (GPU). Program code, including software programs, and/or data may be loaded for execution and processing by the CPU and/or GPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

In some embodiments, memory 26 is one level in a multi-level (hierarchical) memory.

Virtual Memory Splitting

Figure 2:
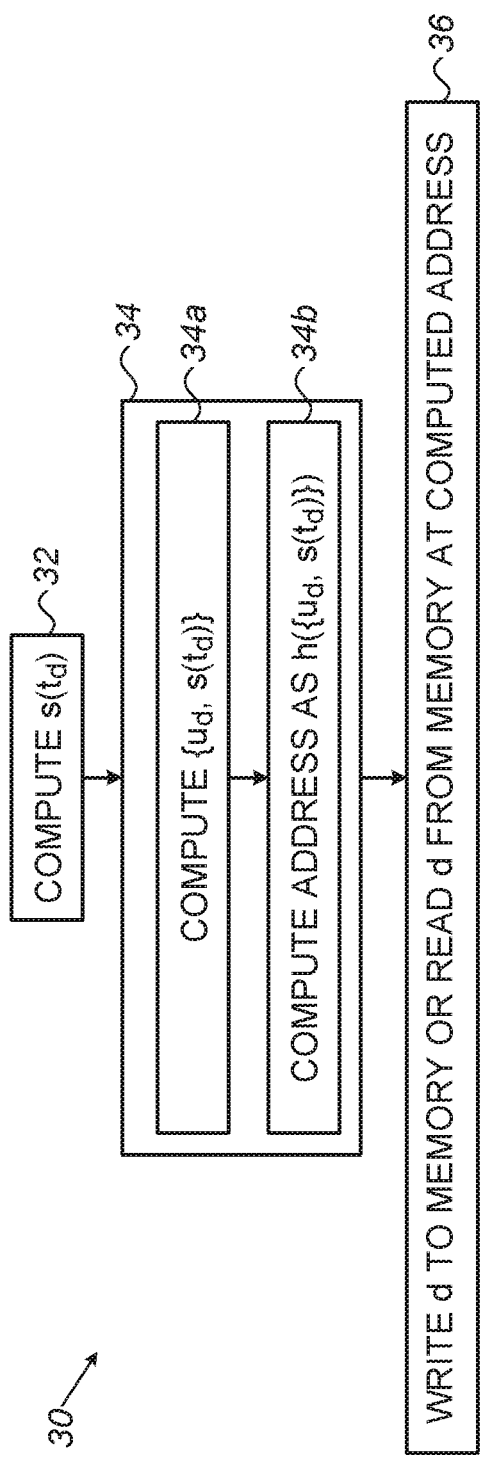
FIG. 2 is a flow diagram for an example algorithm for writing a data item to, or reading a data item from, a memory, in accordance with some embodiments of the present invention.

Reference is now made to FIG. 2, which is a flow diagram for an example algorithm 30 for writing a data item to, or reading a data item from, memory 26, in accordance with some embodiments of the present invention. Algorithm 30 may be executed by any processor that uses memory 26, such as any of the processors described above with reference to FIGS. 1A-B.

By way of introduction, it is noted that algorithm 30 uses two parameters to compute the address in the memory for any particular data item d: a tag $t_d$ of d, and a sequence $u_d$ of one or more bits representing the class of d.

In general, tag $t_d$ may include any suitable parameter associated with d. For example, in the case of FIG. 1A, $t_d$ may include a destination IP address for which d includes packet-processing instructions. (Thus, the destination IP address of each received packet may be used to look up packet-processing instructions for the packet.) As another example, in the case of FIG. 1B, $t_d$ may an include the address in the main memory (e.g., RAM) of computer 28 in which d is stored. In some embodiments, $t_d$ includes $u_d$, e.g., by virtue of $u_d$ being appended to one of the parameters described above.

As described above with reference to FIG. 1A, each data item may include one or more packet-processing instructions for packets belonging to any flow of network traffic whose identifier includes a specific value of at least one field. In such embodiments, $u_d$ may represent the class of d by virtue of indicating the value; for example, $u_d$ may indicate a specific source address, or a combination of a specific source address with a specific destination address. $u_d$ may indicate the value by including any suitable binary representation of the value. Alternatively or additionally, $u_d$ may include a serial number that indicates the value. For example, $u_d$ may be . . . 00 for a first source address (or group of source addresses), . . . 01 for a second source address (or group of source addresses), etc.

Alternatively or additionally, as described above with reference to FIG. 1A, the packet-processing instructions may be for packets received at a specific port, and $u_d$ may represent the class of d by virtue of indicating the port. For example, $u_d$ may include any suitable binary representation of the port number of the port, and/or a serial number that indicates the port.

Alternatively, as described above with reference to FIG. 1B, $u_d$ may represent the class of d by virtue of identifying the processor, core, and/or process computing the address. For example, $u_d$ may include any suitable binary representation of an identifier of the processor, core, or process, such as a Process ID for a Unix process. Alternatively or additionally, $u_d$ may include a serial number that indicates the processor, core, or process. For example, $u_d$ may be 0 for processor 24a (FIG. 1B) and 1 for processor 24b.

More generally, the data items stored in the memory may be classified per any suitable classification scheme. In other words, any suitable set of classes may be defined such that each data item belongs to a respective one of the classes. (Another example classification scheme is described below in the subsection entitled "Additional embodiments.") Moreover, $u_d$ may represent the class of any given data item d in any suitable way.

Algorithm 30 begins with a tag-hash-computing step 32, at which the processor computes a sequence $s(t_d)$ of bits by applying a function s to $t_d$. s maps to N<M different values, M being the number of locations in the memory; hence, $s(t_d)$ includes ceiling($\log_2$ N) bits, where ceiling(x) is the smallest integer greater than or equal to x.

In some embodiments, s is a hash function that hashes to N different values. In other embodiments, $s(°)=v(s'(°))$, where s' is a hash function that hashes to more than N values, and v is a function that maps the range of s' to a smaller range of N values. For example, each value in the range of s' may include more than ceiling($\log_2$ N) bits, and v may select ceiling($\log_2$ N) bits from any sequence of more than ceiling($\log_2$ N) bits, e.g., by truncating the sequence. In any case, given that, typically, $s(t_d)$ is computed by application of a hash function to $t_d$, $s(t_d)$ is referred to herein as a "tag hash."

Subsequently to computing $s(t_d)$, the processor, at an address-computing step 34, computes an address from $u_d$ and $s(t_d)$. More specifically, at a first sub-step 34a of address-computing step 34, the processor computes a combination of $u_d$ with $s(t_d)$, this combination being represented herein by the notation $\{u_d, s(t_d)\}$. For example, the processor may concatenate $u_d$ with $s(t_d)$, i.e., compute a bit-sequence in which $s(t_d)$ is appended to $u_d$ or $u_d$ is appended to $s(t_d)$. Alternatively, the processor may compute a bit-sequence in which the bits of $u_d$ are interspersed with those of $s(t_d)$ according to a predefined interspersion scheme, such as a scheme in which bits of $s(t_d)$ alternate with bits of $u_d$.

Subsequently, at a second sub-step 34b of address-computing step 34, the processor computes the address by applying another function h, which maps to any one of the M addresses in the memory, to the combination of $u_d$ with s $(t_d)$. This operation may be represented by the notation $A_d=h(\{u_d, s(t_d)\})$, where $A_d$ is the computed address for d.

In some embodiments, h is a hash function whose range includes the M addresses in the memory. In other embodiments, $h(°)=w(h'(°))$, where h' is a hash function, and w is another function that maps the range of h' to the range of M addresses. For example, each value in the range of h' may include more than ceiling($\log_2$ M) bits, and w may select ceiling($\log_2$ M) bits from any sequence of more than ceiling ($\log_2$ M) bits, e.g., by truncating the sequence. Alternatively or additionally, w may apply any other suitable operation to h'(°), such as by adding a fixed offset to h'(°). (Thus, for example, h'(°) may hash to the range 0 . . . 7, and w may map this range to the range of addresses [111000, 111001, 111010, 111011, 111100, 111101, 111110, 111111].)

Finally, at a memory-using step 36, the processor writes d to the memory, or (assuming no cache miss is experienced) reads d from the memory, at the computed address.

Figure 3:
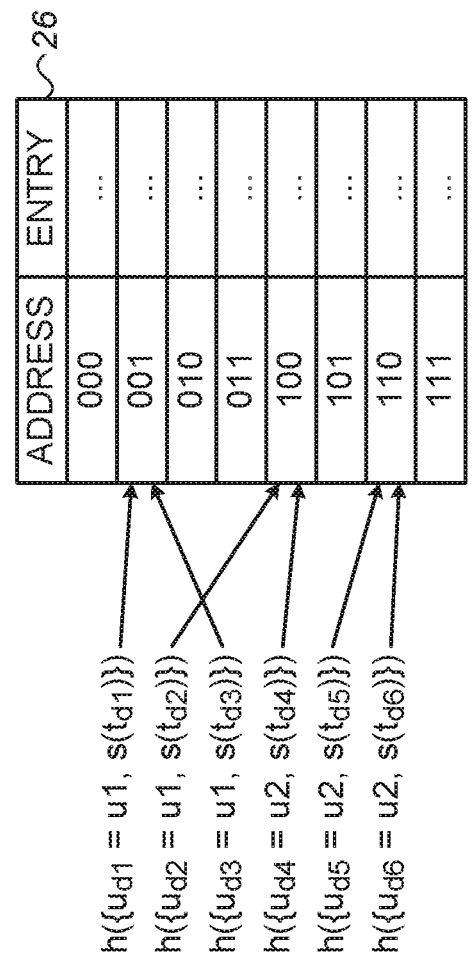
FIG. 3 schematically illustrates virtual splitting of a memory, in accordance with some embodiments of the present invention.

For a demonstration of the virtual splitting of memory 26 effected by this technique, reference is now made to FIG. 3, which schematically illustrates a virtual splitting of memory 26, in accordance with some embodiments of the present invention.

FIG. 3 shows a simplified example scenario in which the memory includes M=8 locations addressed from zero (000) to seven (111). The number N of values in the range of s is assumed to be two, such that each tag hash includes exactly one bit. (Typically, in practice, the respective values of M and N are much larger than assumed in FIG. 3.) The processor is shown accessing the memory, in this scenario, for six data items d1 . . . d6. Data items d1 . . . d3 belong to one class represented by a bit-sequence u1, while data items d4 . . . d6 belong to another class represented by another bit-sequence u2.

Given that N=2, each class may occupy, at most, two locations in the memory at any given time. For example, FIG. 3 assumes that u1, in combination with any tag hash, is mapped either to address 001 or to address 100. (For example, u1 in combination with a tag hash of 0 may be mapped to 001, while u1 in combination with a tag hash of 1 may be mapped to 100.) Consequently, the address for d1, $h(\{u1, s(t_{d1})\})$, may be 001, the address for d2 may be 100, and the address for d3 may be 001. Similarly, FIG. 3 assumes that u2, in combination with any tag hash, is mapped either to address 100 or to address 110. Consequently, the address for d4 may be 100, and the address for each of d5 and d6 may be 110.

It is noted that the splitting of the memory is described herein as being a "virtual" splitting, given that multiple classes may occupy the same location in the memory at different times. For example, in the case of FIG. 3, u1 and u2 overlap at 100. An advantage of virtual splitting over "hard" splitting, in which each class is allotted a fixed subset of the locations in the memory, is that the maximum number of locations allotted to each class is not limited by the total number of classes that share the memory. For example, two processors sharing the memory may each be allotted a maximum of 75% of the memory. Moreover, the maximum number of locations allotted to each class need not be changed in the event that a class is added or removed.

It is further noted that each memory entry typically includes the tag of the data item along with the data item itself. Hence, before reading a particular entry, the processor may check, based on the tag, whether the entry actually contains the sought data item. For example, if the processor is seeking d1, the processor, after computing the address 001 for d1, may check the tag stored at 001 to ascertain whether the entry includes d1 or another data item, such as d3. (In the latter case, the processor may be said to experience a cache miss.) Similarly, if the processor is seeking d2, the processor, after computing the location 100 for d2, may check the tag stored at 100 to ascertain whether the location contains d2 or another data item, such as d4.

Reference is now made to FIG. 4, which is a flow diagram for an alternate example algorithm 31 for writing a data item to, or reading a data item from, memory 26, in accordance with some embodiments of the present invention. In some embodiments, the processor executes algorithm 31 instead of algorithm 30 (FIG. 2).

Algorithm 31 differs from algorithm 30 in that address-computing step 34 comprises a different sequence of sub-steps. In particular, at an alternate first sub-step 34c of address-computing step 34, the processor computes a sequence $g(u_d)$ of one or more bits by applying another function g to $u_d$. Next, at an alternate second sub-step 34d of address-computing step 34, the processor computes the address by combining $s(t_d)$ with $g(u_d)$, e.g., by concatenating the two (in either order) or interspersing the bits of one with the bits of the other according to a predefined interspersion scheme. Optionally, the processor may further apply an operation z to $\{g(u_d), s(t_d)\}$—including, for example, the addition of a fixed offset to $\{g(u_d), s(t_d)\}$—so as to map the range of $\{g(u_d), s(t_d)\}$ to the M memory addresses. The computation of the address may be represented by the notation $A_d = \{g(u_d), s(t_d)\}$ or $A_d = z(\{g(u_d), s(t_d)\})$.

Given that the addresses include ceiling($\log_2 M$) variable bits and $s(t_d)$ includes ceiling($\log_2 N$) bits, $g(u_d)$ includes $B$=ceiling($\log_2 M$)—ceiling($\log_2 N$) bits, and hence maps to $2^B$ different values. (For M and N being powers of two, $2^B$=M/N.) Consequently, it is required that N be small enough such that B is at least one, and hence, $g(u_d)$ maps to at least two different values.

In some embodiments, g is a hash function that hashes to $2^B$ different values. In other embodiments, $g(°)=p(g'(°))$, where g' is a hash function that hashes to more than $2^B$ values, and p is a function that maps the range of g' to a smaller range of $2^B$ values. For example, each value in the range of g' may include more than B bits, and p may select B bits from any sequence of more than B bits, e.g., by truncating the sequence.

For a demonstration of the virtual splitting of memory 26 effected by this technique, reference is now made to FIG. 5, which schematically illustrates a virtual splitting of memory 26, in accordance with some embodiments of the present invention.

FIG. 5 shows the processor accessing the memory for six data items d1 ... d6 in another example scenario in which M=8 and N=2. For each data item d, the processor computes the address by concatenating $g(u_d)$ with $s(t_d)$. g maps to 8/2=4 different values, and hence, $g(u_d)$ has two bits. d1 and d2 belong to a first class represented by a first bit-sequence u1, d3 and d4 belong to a second class represented by a second bit-sequence u2, and d5 and d6 belong to a third class represented by a third bit-sequence u3.

As in the case of FIG. 3, given that N=2, each class may occupy, at most, two locations in the memory. For example, FIG. 5 assumes that g(u1)=00, such that any data item belonging to the first class has address 000 or address 001. Consequently, the address for d1, $\{g(u1), s(t_{d1})\}$, may be 001 (assuming $s(t_{d1})$=1), and the address for d2 may be 000. Similarly, FIG. 5 assumes that g(u2)=g(u3)=10, such that the address for both d3 and d6 may be 101 while the address for both d4 and d5 may be 100.

The virtual splitting of FIG. 5 differs from that of FIG. 3 in that, in the case of FIG. 5, any two classes either fully overlap, i.e., occupy the same set of locations in the memory (as in the case of u2 and u3), or do not overlap at all. On the other hand, in the case of FIG. 3, two classes may partially overlap.

Reference is now made to FIG. 6, which is a schematic illustration of an association of data-item classes with respective functions, in accordance with some embodiments of the present invention.

In some embodiments, the maximum number of memory locations that may be occupied by one class at any given time may be different from the maximum number of memory locations that may be occupied by another class at any given time. For example, for embodiments in which the memory is shared by multiple processes, a higher-priority process may be allocated a greater portion of the memory than a lower-priority process.

In such embodiments, memory 24m (FIG. 1A) stores an association between the classes of data items and respective functions for computing the tag hash, N varying between at least two of the functions. Such an association is typically specified in a lookup table 38. (In the event memory 26 (FIGS. 1A-B) is shared by multiple processors, one of the processors may be privileged with the maintenance of lookup table 38, or this privilege may be shared.) Prior to computing the tag hash at tag-hash-computing step 32 (FIGS. 2 and 4), the processor selects the function s in response to the function s being associated, in memory 24m, with the class of the data item.

FIG. 6 shows a purely illustrative example in which a first class and second class are each associated with a first function s1, which maps to N1 values, while a third class is associated with a second function s2, which maps to N2 values.

It is noted that lookup table 38 need not necessarily specify the functions along with their respective N-values, as shown in FIG. 6. For example, lookup table 38 may specify the functions without the N-values. Alternatively, the lookup table may specify the functions implicitly, by specifying the different respective range sizes to which the output of a particular hash function is to be mapped. Thus, for example, the tag hash for a first class may be computed as the N1-bit hash value returned by a hash function s', while the tag hash for a second class may be computed as the N2 most significant bits of the hash value returned by s', where N2<N1. (Optionally, lookup table 38 may contain two different functions that map to the same number of values.)

Optionally, at least one class may be allotted the entire memory, in that N may be equal to M for this class, provided that algorithm 31 (FIG. 4), which requires that $g(u_d)$ include at least one bit, is not used.

In general, associations between classes and functions may be added or removed by the processor as classes are added or removed. For example, for embodiments in which the memory is shared by multiple processes, the processor may add or remove an entry in the lookup table each time a process starts or finishes, respectively. Moreover, the processor may change the function associated with a particular class during use of the memory. For example, in response to identifying an attack on the memory—particularly, the portion of the memory allotted to the particular class—the processor may replace the current function for the class with another function having a smaller value of N, so as to reduce the number of locations affected by the attack.

In some embodiments, the processor identifies attacks on the memory by monitoring, for each class, (i) the percentage p1 of data items written to the memory that belong to the class, and (ii) the percentage p2 of read attempts for the class that are successful, i.e., that do not result in a cache miss. If p1 is relatively high but p2 is relatively low for a particular class, the processor may identify an attack on the memory. For example, the processor may identify an attack in response to p1 exceeding a predefined threshold and p2 being below another predefined threshold, or in response to the ratio p1/p2 exceeding a predefined threshold.

Additional Embodiments

In some embodiments, the class of each data item corresponds to the level of privilege required to overwrite the data item in the memory; in other words, $u_d$ represents the class of d by virtue of indicating the level of privilege. Thus, advantageously, the maximum number of memory locations that may be occupied by data items requiring a higher level of privilege may be limited.

Embodiments in which such a classification scheme may be used include those in which networking element 20 (FIG.

1A) comprises a switch configured to learn the port 22 to which the device having any given MAC address is connected. In such embodiments, hardware executor 24*h* stores, in the memory, various associations between MAC addresses and port identifiers, each MAC address being stored as the tag for its associated port identifier. Intermittently (e.g., periodically), software executor 24*s* executes an association-checking routine, in which the software executor accepts or rejects each of the associations stored by the hardware executor subsequently to the previous execution of the association-checking routine. To prevent any newly-stored associations from being overwritten by hardware executor 24*h* before the next execution of the association-checking routine, the hardware executor stores each association as a static entry, which requires a higher level of privilege—namely, that of software executor 24*s*—to be overwritten. If the association is accepted by the software executor, the association remains in the memory as a static entry; otherwise, the association is converted to a non-static entry, which may be overwritten even by the hardware executor.

In such embodiments, there is a risk that a large number of unchecked associations may flood the memory, thus limiting the number of regular cache entries that may be stored by the hardware executor. To mitigate this risk, the memory may be virtually split between the (static) associations and the (non-static) cache entries. In particular, the associations may be allotted a relatively small portion of the memory (i.e., the associations may be assigned a relatively small N), the size of this portion being computed as a function of a target learning rate (i.e., a target number of MAC address/port associations learned per unit time) and the time between successive executions of the association-checking routine.

In some embodiments, the processor may change the classification scheme during use of the memory. For example, referring again to FIG. 1B, the data items may be initially classified into two classes: a first class corresponding to processor 24*a*, and a second class corresponding to processor 24*b*. Subsequently, the number of processes executed simultaneously by one or both of the processors may exceed a predefined threshold. In response thereto, one of the processors may split the first class into multiple classes corresponding to the processes executed by processor 24*a*, respectively, and/or split the second class into multiple classes corresponding to the processes executed by processor 24*b*, respectively.

Alternatively or additionally, the processor may use multiple classification schemes simultaneously. For example, for each received packet, processor 24 (FIG. 1A) may first compute a first address, using, as the class, the value of a field belonging to a first layer of the identifier of the flow to which the packet belongs. Subsequently, the processor may look up a first data item stored at the first address. Next, the processor may compute a second address, using, as the class, the value of another field belonging to a second layer. The processor may then look up a second data item stored at the second address.

In general, each of the hash functions described above may be cryptographic or non-cryptographic. Purely illustrative examples of hash functions suitable for implementing the techniques described above include Murmurhash (e.g., MurmurHash3) and xxHash.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
a memory, comprising a plurality of memory locations having different respective addresses; and
a processor to:
compute one of the addresses from (i) a first sequence of bits derived from a tag of a data item, and (ii) a second sequence of bits representing a class of the data item, and
write the data item to the memory location having the computed address or read the data item from the memory location having the computed address,
the first sequence of bits having a number of possible values that is less than a number of the memory locations, such that the class of the data item cannot occupy all the memory locations at once despite not being allotted a fixed subset of the memory locations.

2. The system according to claim 1, wherein the processor is further to compute the first sequence of bits by applying a function, which maps to any one of the possible values, to the tag.

3. The system according to claim 2,
wherein the function is a first function, and
wherein the processor is to compute the address by applying a second function, which maps to any one of the addresses, to a combination of the second sequence with the first sequence.

4. The system according to claim 3, wherein the processor is to apply the second function to a concatenation of the second sequence with the first sequence.

5. The system according to claim 2, further comprising another memory to store an association between multiple classes of data items and respective functions that include the function,
wherein at least two of the functions map to different respective numbers of possible outputs, and
wherein the processor is further to select the function in response to the function being associated, in the other memory, with the class of the data item.

6. The system according to claim 5, wherein the function is a first function, and wherein the processor is further to associate with the class of the data item, in the other memory, a second function, which maps to a smaller number of possible outputs than does the first function, in response to identifying an attack on the memory.

7. The system according to claim 1, wherein the data item includes one or more packet-processing instructions for packets belonging to any flow of network traffic whose flow identifier includes a specific value of at least one field, and wherein the second sequence represents the class of the data item by virtue of indicating the specific value.

8. The system according to claim 7, wherein the at least one field includes a field selected from the group of fields consisting of: a layer-2 source address, a layer-3 source address, a layer-4 source address, a layer-2 destination address, a layer-3 destination address, and a layer-4 destination address.

9. The system according to claim 1, wherein the data item includes one or more packet-processing instructions for packets received at a specific port, and wherein the second sequence represents the class of the data item by virtue of indicating the port.

10. The system according to claim 1, wherein the second sequence represents the class of the data item by virtue of identifying a process, running on the processor, that writes the data item to the memory location having the computed address or reads the data item from the memory location having the computed address.

11. The system according to claim 1, wherein the second sequence represents the class of the data item by virtue of identifying the processor.

12. The system according to claim 1, wherein the second sequence represents the class of the data item by virtue of indicating a level of privilege required to overwrite the data item in the memory.

13. The system according to claim 2,
wherein the function is a first function, and
wherein the processor is to compute the address by:
computing a third sequence of bits by applying a second function to the second sequence of bits, and
combining the first sequence of bits with the third sequence of bits.

14. The system according to claim 13,
wherein the second function maps to $2^B$ different values, B being a difference, of at least one, between (i) a first smallest integer that is greater than or equal to a logarithm-to-a-base-of-two of the number of memory locations, and (ii) a second smallest integer that is greater than or equal to a logarithm-to-a-base-of-two of the number of possible values.

15. A method for use with a memory including a plurality of memory locations having different respective addresses, the method comprising:
using a processor, computing one of the addresses from (i) a first sequence of bits derived from a tag of a data item, and (ii) a second sequence of bits representing a class of the data item, and
writing the data item to the memory location having the computed address or reading the data item from the memory location having the computed address,
the first sequence of bits having a number of possible values that is less than a number of the memory locations, such that the class of the data item cannot occupy all the memory locations at once despite not being allotted a fixed subset of the memory locations.

16. The method according to claim 15, further comprising computing the first sequence of bits by applying a function, which maps to any one of the possible values, to the tag.

17. The method according to claim 16,
wherein the function is a first function, and
wherein computing the address comprises computing the address by applying a second function, which maps to any one of the addresses, to a combination of the second sequence with the first sequence.

18. The method according to claim 17, wherein applying the second function comprises applying the second function to a concatenation of the second sequence with the first sequence.

19. The method according to claim 16,
wherein another memory stores an association between multiple classes of data items and respective functions that include the function,
wherein at least two of the functions map to different respective numbers of possible outputs, and
wherein the method further comprises selecting the function in response to the function being associated, in the other memory, with the class of the data item.

20. The method according to claim 19, wherein the function is a first function, and wherein the method further comprises associating with the class of the data item, in the other memory, another function, which maps to a smaller number of possible outputs than does the first function, in response to identifying an attack on the memory.

21. The method according to claim 15, wherein the data item includes one or more packet-processing instructions for packets belonging to any flow of network traffic whose flow identifier includes a specific value of at least one field, and wherein the second sequence represents the class of the data item by virtue of indicating the specific value.

22. The method according to claim 21, wherein the at least one field includes a field selected from the group of fields consisting of: a layer-2 source address, a layer-3 source address, a layer-4 source address, a layer-2 destination address, a layer-3 destination address, and a layer-4 destination address.

23. The method according to claim 15, wherein the data item includes one or more packet-processing instructions for packets received at a specific port, and wherein the second sequence represents the class of the data item by virtue of indicating the port.

24. The method according to claim 15, wherein the second sequence represents the class of the data item by virtue of identifying a process, running on the processor, that writes the data item to the memory location having the computed address or reads the data item from the memory location having the computed address.

25. The method according to claim 15, wherein the second sequence represents the class of the data item by virtue of identifying the processor.

26. The method according to claim 15, wherein the second sequence represents the class of the data item by virtue of indicating a level of privilege required to overwrite the data item in the memory.

27. The method according to claim 16,
wherein the function is a first function, and
wherein computing the address comprises computing the address by:
computing a third sequence of bits by applying a second function to the second sequence of bits, and
combining the first sequence of bits with the third sequence of bits.

28. The method according to claim 27,
wherein the second function maps to $2^B$ different values, B being a difference, of at least one, between (i) a first smallest integer that is greater than or equal to a logarithm-to-a-base-of-two of the number of memory locations, and (ii) a second smallest integer that is greater than or equal to a logarithm-to-a-base-of-two of the number of possible values.

* * * * *